(12) United States Patent
Hong

(10) Patent No.: US 7,767,187 B2
(45) Date of Patent: Aug. 3, 2010

(54) METHOD AND APPARATUS FOR SEPARATING CARBON PRODUCT FROM USED TIRE WITH MICROWAVE

(76) Inventor: Charlie Hong, 16046 SE. Chelsea Morning Dr., Happy Valley, OR (US) 97015

( * ) Notice: Subject to any disclaimer, the term of this patent is extended or adjusted under 35 U.S.C. 154(b) by 309 days.

(21) Appl. No.: 11/686,175

(22) Filed: Mar. 14, 2007

(65) Prior Publication Data
US 2008/0226539 A1    Sep. 18, 2008

(51) Int. Cl.
*C01B 7/00* (2006.01)
*C01B 31/02* (2006.01)
*C01B 1/04* (2006.01)
*C01B 17/00* (2006.01)
*C01B 1/00* (2006.01)
*H05B 6/78* (2006.01)
*C10B 57/04* (2006.01)
*B09B 3/00* (2006.01)
*B01J 8/04* (2006.01)
*C10G 1/00* (2006.01)

(52) U.S. Cl. ............... 423/461; 202/113; 202/117; 202/124; 202/150; 202/105; 219/701; 201/25; 422/184.1; 422/189; 208/407; 208/415; 208/427

(58) Field of Classification Search ............... None
See application file for complete search history.

(56) References Cited

U.S. PATENT DOCUMENTS 4,079,221 A * 3/1978 McGillem et al. ........... 219/747

7,101,464 B1 * 9/2006 Pringle ........................ 202/113

FOREIGN PATENT DOCUMENTS

WO    WO 2005073344 A1 *    8/2005

OTHER PUBLICATIONS

Inaba et al.; Treatment of Waste by Arc Discharge Plasmas; IEEE Transactions on Dielectrics and Electrical Insulation; vol. 7, No. 5, pp. 684-692; 2000.*

* cited by examiner

*Primary Examiner*—Melvin C Mayes
*Assistant Examiner*—Guinever S Gregorio
(74) *Attorney, Agent, or Firm*—John K. Park; Park Law Firm

(57) ABSTRACT

An apparatus for separating carbon products from used tires includes a decomposing chamber into which used tires are charged, a nitrogen gas supply device that supplies nitrogen gas into the decomposing chamber, one or more magnetrons that generate microwave of predetermined frequency and one or more phase shifters that removes interference between microwaves generated by the magnetrons, a receiving plate that is adapted to receive carbon black and iron cores generated by the decomposing process, a tire support that is adapted to support used tires, an opening and closing device that opens or closes a door on which used tires are placed, conveyor belt that moves carbon black and iron cores to a desired location after decomposition is complete, and a cooling plate that is provided in an upper portion of the apparatus and cools down gaseous oil that is generated by decomposition by microwave into liquid oil.

5 Claims, 5 Drawing Sheets

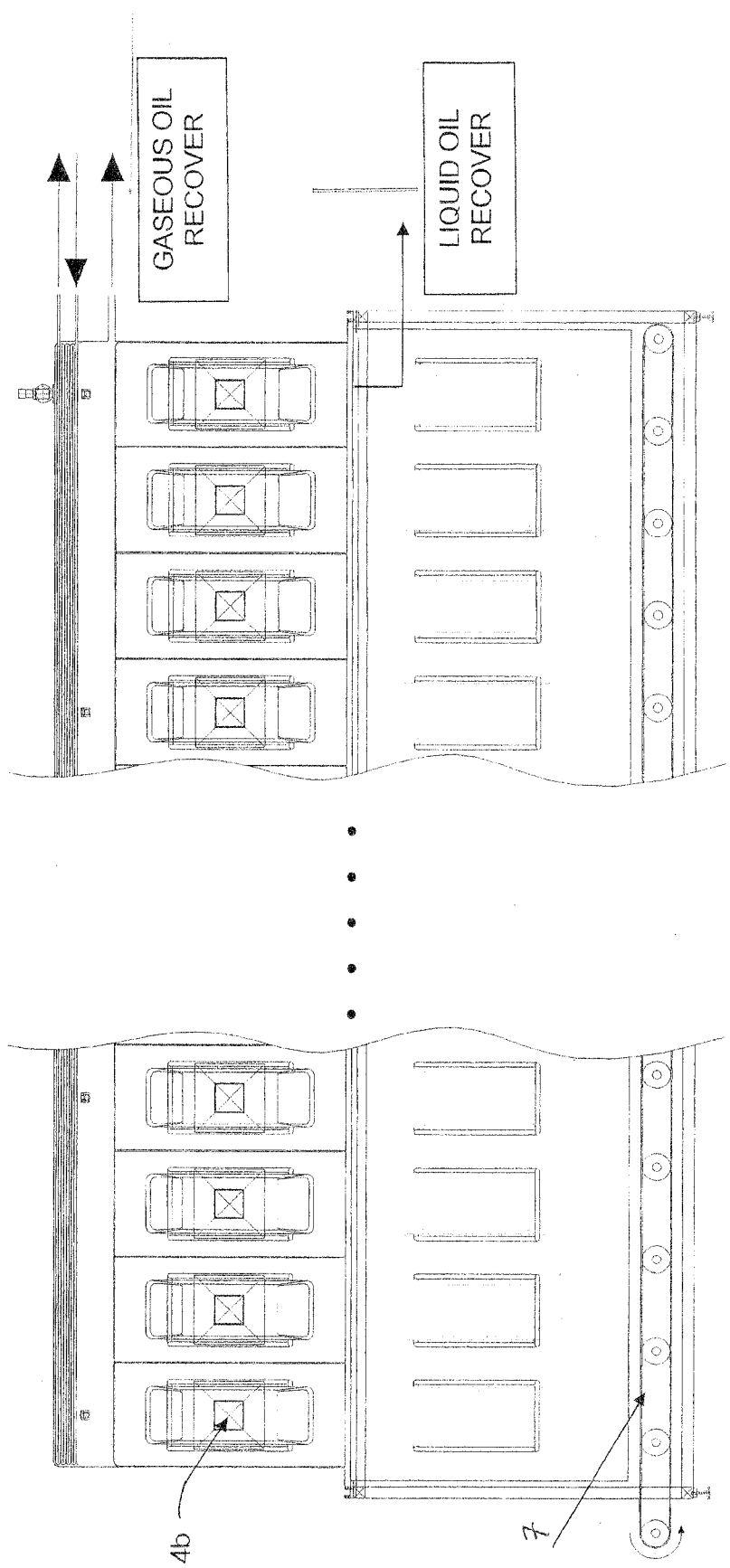

METHOD AND APPARATUS FOR SEPARATING CARBON PRODUCT FROM USED TIRE WITH MICROWAVE

BACKGROUND OF THE INVENTION

The present invention relates to method and apparatus for separating carbon product from used tire. More particularly, the present invention relates to highly efficient method and apparatus for decomposing used tires using specific wavelength ranges of microwave in non-reacting environment.

With wide and ever increasing use of automobiles, proper disposal of used tires has become important. Currently, about 3 billion used tires are waiting for disposal in USA and it is estimated that about two hundred million used tires are generated every year (Korea Tire Manufacturers Association). A tire is mainly composed of synthetic polymer materials, and the calorific value is about 34 MJ/kg, which is greater than 29 MJ/kg, the reference calorific value of coal. Typical composition of a tire excluding the iron core and fabric is styrene-butadiene copolymer 43.5 wt %, carbon black 32.6 wt %, oil 21.7 wt %, and additives 2.2 wt %, which includes sulfur and zinc oxide.

For environmental reasons, combustion of tires is prohibited since it produces many pollutants. Recycling methods for tires other than combustion include a recycled tire, recycled rubber, an artificial fishing bank, a buffer, etc. Processes for fueling of tire include breaking, direct burning and extracting fuel. Direct burning of tire includes burning solely tire, burning mixture of tire with coal or oil, and fuel for burning cement.

Method of extracting fuel includes liquefying and thermal decomposition. Liquefying tire is similar to liquefying coal and has less than 0.1% sulfur in the produced fuel liquid. Thermal decomposition of tire includes heating tire at relatively low temperature and it is possible to recover oil, gas, carbon and dry distillation residue. The calorific value of extracted fuel oil is 33 MJ/kg, which is similar to that of A grade heavy oil, and the recovered carbon may be used as carbon black and activated charcoal.

Dry distillation processes of tire by prior art are classified into two categories, direct heating and indirect heating. Referring to FIG. 1, the direct heating method blows combustion gas from a burner 110 directly into a reaction furnace 112. Efficiency is better than the indirect heating method since the combustion gas directly contacts the used tires 114. However since excessive amount of oxygen is also injected into the reaction furnace, there is possibility of explosion with the vaporized oil inside the furnace. Also substantial amount of water, and carbon generated through reaction of rubber and oxygen are mixed with the product thereby degrading the quality of the oil.

Referring to FIG. 2, the indirect heating method heats used tires, which are stacked and isolated from outside, from outside. The heated tires decompose at high temperature and produce gaseous oil, which is cooled and collected in liquid state. Part of the recovered oil is used for supplying energy for thermal decomposition of tires. The disadvantages are that the heating efficiency is very low and most of the recovered oil is used up for heating the furnace, and the heating efficiency becomes worse as the size of the reaction furnace becomes bigger.

SUMMARY OF THE INVENTION

The present invention contrives to solve the disadvantages of the prior art.

An objective of the invention is to provide efficient method and apparatus for decomposing used tires.

Another objective of the invention is to provide an installation for decomposing used tires that are constructed with units and having a good scalability.

In order to achieve the above objective, the present invention provides a method for separating carbon products from used tires comprising steps of injecting nitrogen gas into a decomposing chamber, into which used tires are charged, to remove oxygen inside the decomposing chamber, applying microwave with one or more wavelengths, which are industrially allowed to use, when the pressure inside the decomposing chamber reaches the threshold partial pressure for which explosion does not occur, and adding functional additives. The applied microwave heats the used tires and decomposes them into carbon products that include oil and carbon black and iron cores.

The functional additives react with the microwave, and include antioxidant, zinc oxide, cobalt salt, or sulfur compound.

The microwaves are controlled with a shifter to minimize interference in the decomposing chamber.

In the step of applying microwave, plasma is generated with an arc discharge device to heat reacting materials together with the microwave.

The present invention also provides an apparatus for separating carbon products from used tires. The apparatus includes a decomposing chamber into which used tires are charged, a nitrogen gas supply device that supplies nitrogen gas into the decomposing chamber, one or more magnetrons that generate microwave of predetermined wavelength, and one or more phase shifters that removes interference between microwaves generated by the magnetrons.

The apparatus may further comprise a receiving plate that is adapted to receive carbon black and iron cores generated by the decomposing process, a tire support that is adapted to support used tires, an opening and closing device that opens or closes a door on which used tires are placed, a conveyor belt that moves carbon black and iron cores to a desired location after decomposition is complete, a cooling plate that is provided in an upper portion of the apparatus and cools down gaseous oil that is generated by decomposition by microwave into liquid oil, a pressure operated valve that provides safety against high pressure and high temperature gas, an oxygen sensor that checks the amount of oxygen in the decomposing chamber against danger of explosion, a microwave leak sensor that detects leak of microwave, a cooling line that forcefully cools the decomposition chamber and a sprinkler that is provided inside the chamber.

The present invention also provides an installation for separating carbon products from used tires. The installation comprises one or more decomposing units. Each of the decomposing units has the same structure of the apparatus described above.

The advantages of the present invention are: (1) the method and apparatus are safer and more efficient than the prior art; (2) the conversion efficiency from electric power to heat is 80%, which is very high value; (3) the temperature of the decomposing chamber is low and time for cooling is not needed, thereby increasing the throughput; (4) for the method, the energy consumed is ½, the cost is ⅓, the decomposing time is ⅙ compared to those of indirect heating method, and recovered oil amount is greater; (5) the apparatus is provided as units and from small to large apparatus is possible to construct with combination of units while prior art devices require large investment and space; (6) the magnetrons can be selectively used; and (7) cooling time after decomposing is minimized by the water cooled cooling line.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIG. 5 is an elevation view that shows an installation for decomposing used tires that comprises a plurality of apparatuses.

DETAILED DESCRIPTION OF THE INVENTION

The present invention uses microwave having predetermined frequencies that are allowed to use in the industry to decompose used tires into carbon products and iron cores, etc. A plurality of microwaves having the same frequency are radiated into a decomposing chamber without interference. A high-voltage arc discharge plasma adds initial decomposition ignition process thereby reducing the process time and increasing process amount.

Generally, if multiple waves have the same frequency and phase, interference between them occurs and cancelling and amplification, etc. are resulted. A phase shifter 44 is used to eliminate such interference. Use of a phase shifter overcomes difficulties of applying microwave in decomposing used tires, and enables scalable decomposing apparatus that can be constructed up to a very large size.

The present invention can increase energy efficiency, decrease danger of explosion, and solve problems in forcefully heating method, which are substantial deviation of temperature, reduction of oil recovery due to increase of not condensed gas in a condenser when the temperature rises over the vaporization temperature, leak through a seal due to high pressure in the chamber, and long cooling time due to high temperature of the chamber.

The present invention uses two frequencies, 2.45 GHz and 915 MHz, which are allowed in industrial use in Korea and US. The functional additives in the used tires, which include antioxidant, zinc oxide, cobalt salt, and sulfur compound, are utilized as catalysts and cooperate. Used tires are decomposed with ignition mechanism and continuous decomposing activity.

Figure 1:
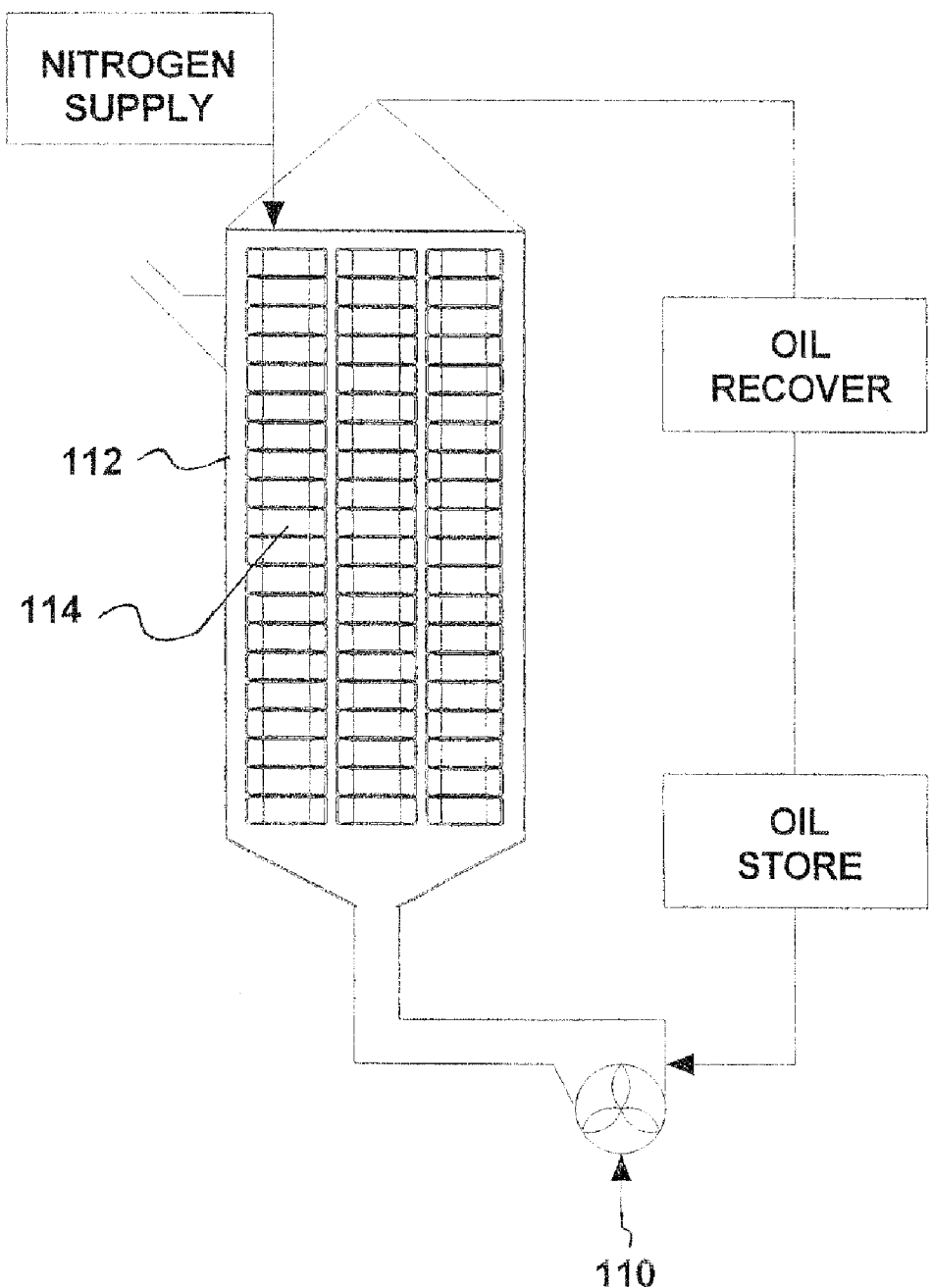
FIG. 1 is a schematic diagram that shows direct heating method for decomposing used tires by prior art.
Figure 2:
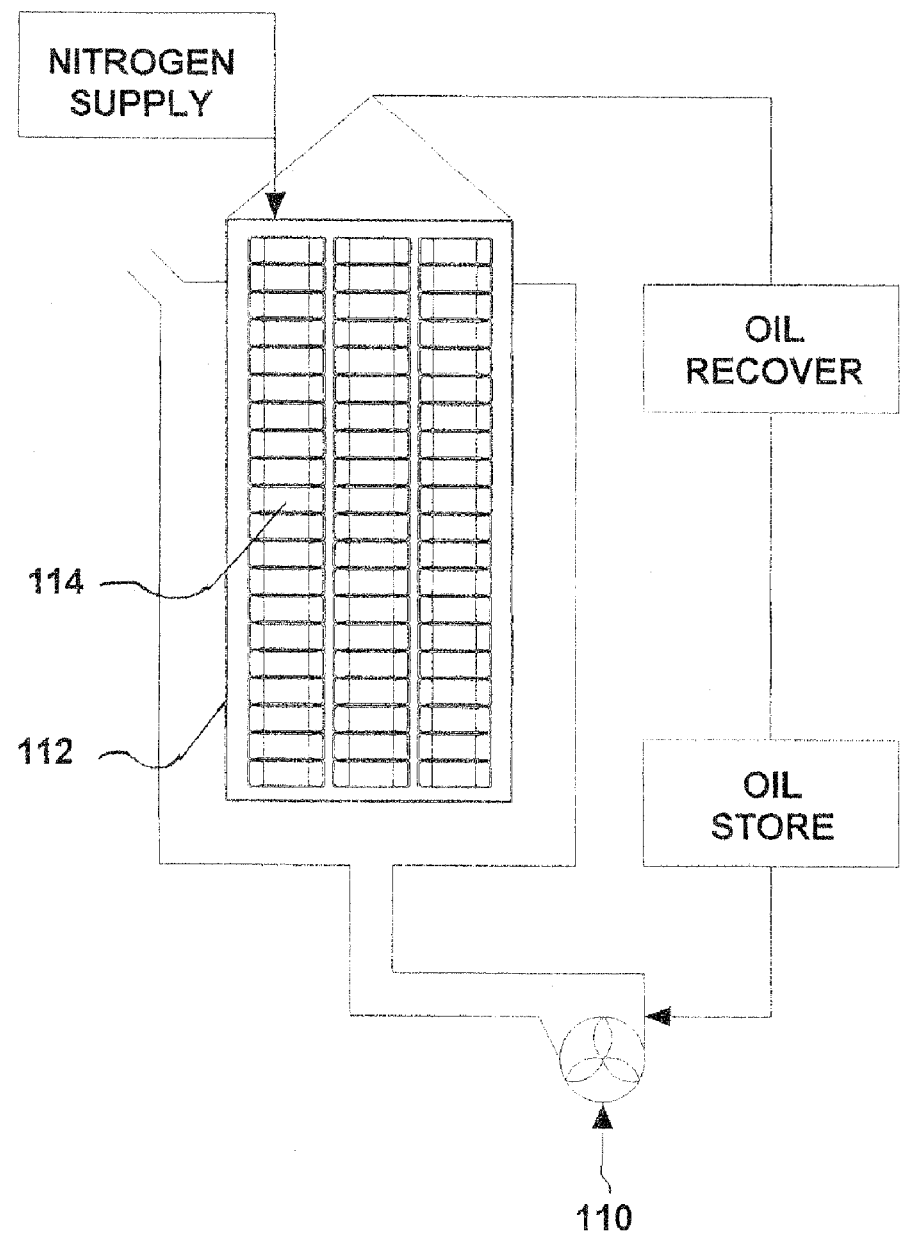
FIG. 2 is a schematic diagram that shows indirect heating method for decomposing used tires by prior art.
Figure 3:
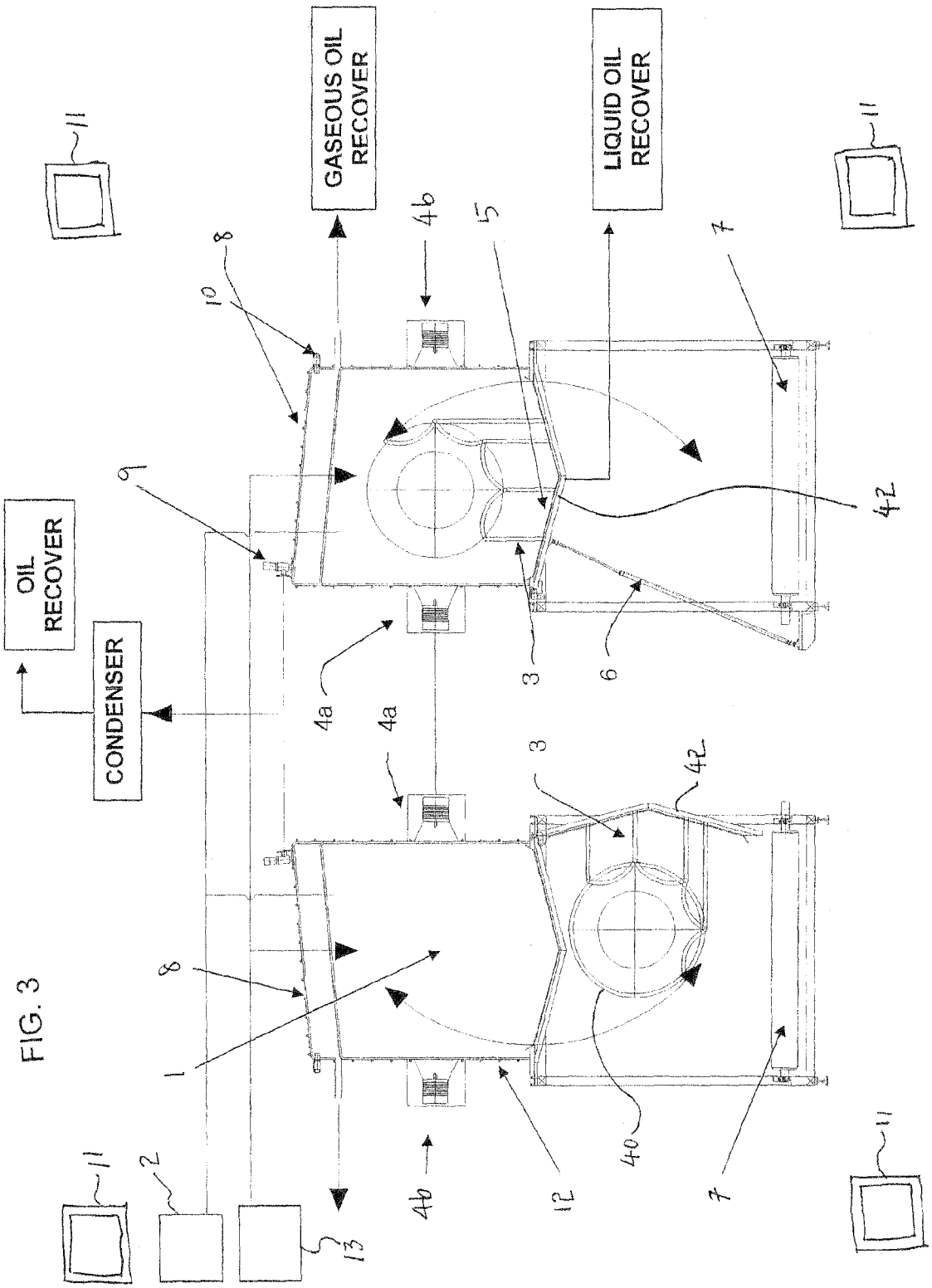
FIG. 3 is an elevation view showing an apparatus for decomposing used tires according to the present invention.
Figure 4:
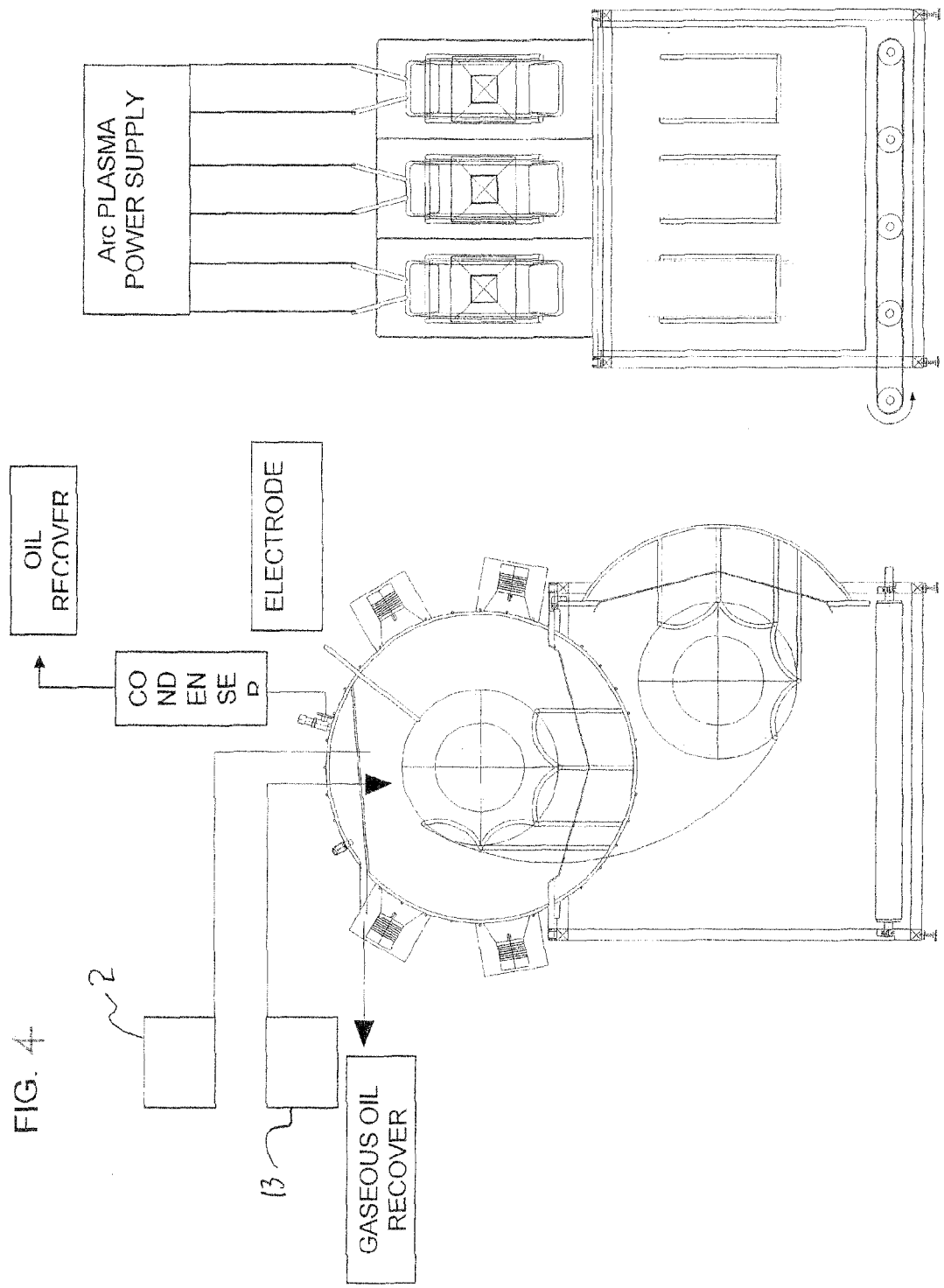
FIG. 4 is an elevation view that shows an apparatus with arc plasma power supply and arc electrodes that increase initial decomposing efficiency.

FIG. 3 shows that an apparatus for heat decomposing used tires according to the present invention. The apparatus includes a decomposing chamber 1, into which used tires 40 and other used rubber products are charged, a nitrogen gas supply device 2, a tire support 3 that facilitates charging of used tires, two magnetrons 4a, 4b, each of which has different wavelength, a receiving plate 5 that is adapted to receive carbon black and iron cores generated by the decomposing process, a hydraulic opening and closing device 6 that opens or closes a door 42 on which used tires are placed, a conveyor belt 7 that moves carbon black and iron cores to a desired location after decomposition is complete, a cooling plate 8 that is provided in an upper portion of the apparatus and cools down gaseous oil that is generated by decomposition by microwave into liquid oil, a pressure operated valve 9 that provides safety against high pressure and high temperature gas, an oxygen sensor 10 that checks the amount of oxygen in the decomposing chamber 1 against danger of explosion, microwave leak sensors 11 that detects leak of microwave, a cooling line 12 that forcefully cools the decomposition after completion of decomposition in order to make opening time of the door 42 earlier or at emergency, and a sprinkler 13 that is provided inside the chamber. The cooling line 12 is installed on the outer wall of the decomposing chamber 1. The cooling line 12 does not cool the decomposing chamber 1 during the decomposing process, and forcefully cools the decomposing chamber 1 after the decomposing process, or when the temperature is excessively high or oxygen inflow is detected.

The decomposing chamber 1 is made of stainless steel that has thermal stability and durability, and has a ceramic lining for electrical and thermal insulation. The tire support 3 has oval-shaped edges to facilitate charging of used tires, to fix used tires stably and to facilitate discharging of carbon black and iron cores when the door 42 is open. The magnetrons 4a, 4b have two different wavelengths, 2.45 GHz and 915 MHz, which are allowed to use by the industrial standard. Microwaves having the wavelengths are effectively absorbed by the functional additives. Decomposed carbon black and iron cores fall down on the receiving plate 5 by gravity. The receiving plate prevents the decomposed material damage a sealing that prevents oxygen inflow. When the decomposing is completed, the door 42 is opened and the conveyor belt 7 moves the carbon black and iron cores to a predetermined location for further treatment and storage. The cooling plate 8 is inclined so that the liquefied oil flows to one direction. The pressure operated valve 9 is automatically opened when the pressure of the heated gas that is generated during decomposition exceeds a predetermined value. The oxygen sensor 10 checks the amount of oxygen within the decomposing chamber 1 to detect danger of explosion. An automatic control system (not shown) stops the apparatus and takes remedial actions when abnormal states are sensed by the pressure operated valve 9, the oxygen sensor 10 or the microwave leak sensor 11. The control system also monitors and controls temperature and coolant circulation of the cooling line 12, temperature of the decomposing chamber 1, hourly power arrangement of the magnetrons 4a, 4b, and the completion timing of the decomposing.

More than one magnetrons 4a1, 4a2; 4b1, 4b2 generating microwave having the same frequency may be provided.

Slitters having a shape of a fan are provided for dispersing microwaves. A rotating plate or turn table is installed in the apparatus for the microwave to be uniformly applied for facilitating decomposing used tires or other used rubber products. The apparatus is constructed with two modules and thus time for cooling after decomposing is reduced.

The present invention can also be used in decomposing various organic material and polymer waste.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A method for separating carbon products from used tires comprising steps of:
   a) lifting used whole tires into a decomposing chamber through the bottom of the decomposing chamber;
   b) injecting nitrogen gas into the decomposing chamber, into which used tires are charged, to remove oxygen inside the decomposing chamber;
   c) applying microwave with one or more predetermined frequencies, which are industrially allowed to use, when the pressure inside the decomposing chamber reaches the threshold partial pressure for which explosion does not occur;
   d) collecting gaseous oil at a cooling plate and liquid oil at a lower portion of the decomposing chamber, wherein the cooling plate is provided in an upper portion of the decomposing chamber to cool down gaseous oil into liquid oil and inclined so that the liquefied oil flows to one direction; and
   e) moving carbon black and iron cores by using a conveyor belt to a desired location after decomposition is complete;

wherein the applied microwave heats the used tires and decomposes them into carbon products that include oil and carbon black and iron cores.

2. The method of claim 1, further comprising step of adding functional additives.

3. The method of claim 2, wherein the functional additives react with the microwave, and include antioxidant, zinc oxide, cobalt salt, or sulfur compound.

4. The method of claim 1, wherein the microwaves are controlled with a shifter to minimize interference in the decomposing chamber.

5. The method of claim 1, wherein in the step of applying microwave, plasma is generated with an arc discharge device to heat reacting materials together with the microwave.

* * * * *